(12) United States Patent
Johnson et al.

(10) Patent No.: US 11,613,855 B1
(45) Date of Patent: Mar. 28, 2023

(54) SYSTEM AND METHOD OF MATERIAL EVACUATION IN MILL CHAMBER

(71) Applicant: Caterpillar Paving Products Inc., Brooklyn Park, MN (US)

(72) Inventors: Nicholas B. Johnson, Dayton, MN (US); Conwell Keefer Rife, Jr., Plymouth, MN (US); Eric S. Engelmann, Delano, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 17/498,407

(22) Filed: Oct. 11, 2021

(51) Int. Cl.
*E01C 23/088* (2006.01)
*E01C 23/12* (2006.01)
*B65G 33/08* (2006.01)

(52) U.S. Cl.
CPC .......... *E01C 23/088* (2013.01); *E01C 23/127* (2013.01); *B65G 33/08* (2013.01)

(58) Field of Classification Search
CPC .............................. E01C 23/088; E01C 23/127
See application file for complete search history.

(56) References Cited

U.S. PATENT DOCUMENTS

| | | | | |
|---|---|---|---|---|
| 3,946,506 A | * | 3/1976 | Snow, Jr. | E02F 3/783 198/301 |
| 5,695,256 A | * | 12/1997 | Kishimoto | E01C 23/088 299/68 |
| 5,850,883 A | | 12/1998 | Schwartz | |
| 7,284,345 B2 | | 10/2007 | Schenk | |
| 2006/0216113 A1 | | 9/2006 | Silbernagel | |

FOREIGN PATENT DOCUMENTS

| | | | |
|---|---|---|---|
| DE | 2847924 C2 | * 11/1987 | |
| EP | 282381 A | * 9/1988 | ........... E01C 19/405 |
| EP | 0282381 A1 | 9/1988 | |
| EP | 0735193 B1 | 12/1999 | |
| WO | 2010045952 A1 | 4/2010 | |

* cited by examiner

*Primary Examiner* — Janine M Kreck

(74) *Attorney, Agent, or Firm* — von Briesen & Roper, s.c.

(57) ABSTRACT

A work machine including a frame, a plurality of ground engaging mechanisms, a conveyor assembly and a mill chamber. The conveyor assembly including a conveyor belt. The mill chamber including an auger and a rotor, the rotor having a plurality of teeth.

19 Claims, 6 Drawing Sheets

SYSTEM AND METHOD OF MATERIAL EVACUATION IN MILL CHAMBER

TECHNICAL FIELD

The present disclosure relates generally to milling machines, and, more specifically, to material evacuation in mill chambers of milling machines.

BACKGROUND

Asphalt-surfaced roadways are built to facilitate vehicular travel. Depending upon usage density, base conditions, temperature variation, moisture levels, and/or physical age, the surfaces of roadways eventually become misshapen and unable to support wheel loads. In order to rehabilitate the roadways for continued vehicular use, spent asphalt is removed in preparation for resurfacing. Cold planers, sometimes also called road planers, pavement profilers, milling machines, etc., are used for scarifying, removing, mixing or reclaiming material from roadway and similar surfaces.

These machines typically have a rotatable cutter, fitted with cutting tools, to break up the surface of the roadway. The rotatable cutter is enclosed within a housing that helps contain discharge of the cut roadway material as it is broken and deposited onto a conveyor for removal. As the cold planer moves along a surface, however, tailings and pieces of asphalt or pavement are often left behind. These tailings must be swept or shoveled by human or machine, which is time consuming and, consequently, costly at a construction site. If left on the cut surface, tailings may be picked up by vehicle wheels and flung onto other vehicles, causing damage to vehicles and other machines. Further, laying asphalt or other paving material on top of an unclean surface, with tailings and debris still present for example, will cause the newly laid pavement or asphalt to deteriorate at a much faster rate than normal.

Prior attempts to gather and convey pavement cuttings are disclosed in US Patent Publication 2006/0216113 (hereinafter the "113 publication"). In particular, the '113 publication discloses a spreader planer road construction machine having a trimmer, auger and conveyor belt. The trimmer provides a fine cut to cement surfaces and a reclaimer assembly, including a horizontally disposed auger, transfer the cutting to a pivoting conveyor, which deposits the cuttings behind the machine.

SUMMARY

In accordance with one aspect of the present disclosure, a work machine is disclosed. The work machine may include a frame, a plurality of ground engaging mechanisms, a conveyor assembly, and a mill chamber. The conveyor assembly may include a conveyor belt. The mill chamber may include an auger and a rotor. The rotor may have a plurality of teeth.

In accordance with another aspect of the present disclosure, a mill chamber assembly for a work machine is disclosed. The mill chamber may include a plurality of side plates, a milling rotor, a first auger, and a second auger. The milling rotor may have a plurality of teeth. The first auger may be rotatably coupled to one of the plurality of side plates, and may have a helical twist in a first rotational direction. The second auger may be rotatably coupled to one of the plurality of side plates, and may have a helical twist in a second direction. The first auger and the second auger may be positioned forward of the milling rotor in a direction of travel of the work machine.

In accordance with yet another aspect of the present disclosure, a method of operating a work machine is disclosed. The work machine may have a milling rotor and an auger, and the auger may be positioned ahead of the milling rotor in the direction of travel of the work machine. The method may include positioning the milling rotor and the auger proximate a pavement surface; rotating the milling rotor and the auger; milling a portion of the pavement surface; generating tailings; driving, by the auger, the tailings toward a conveyor belt; and conveying, by the conveyor belt, the tailings away from the work machine.

These and other aspect and features of the present disclosure will be better understood upon reading the following detailed description when taken in conjunction with the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
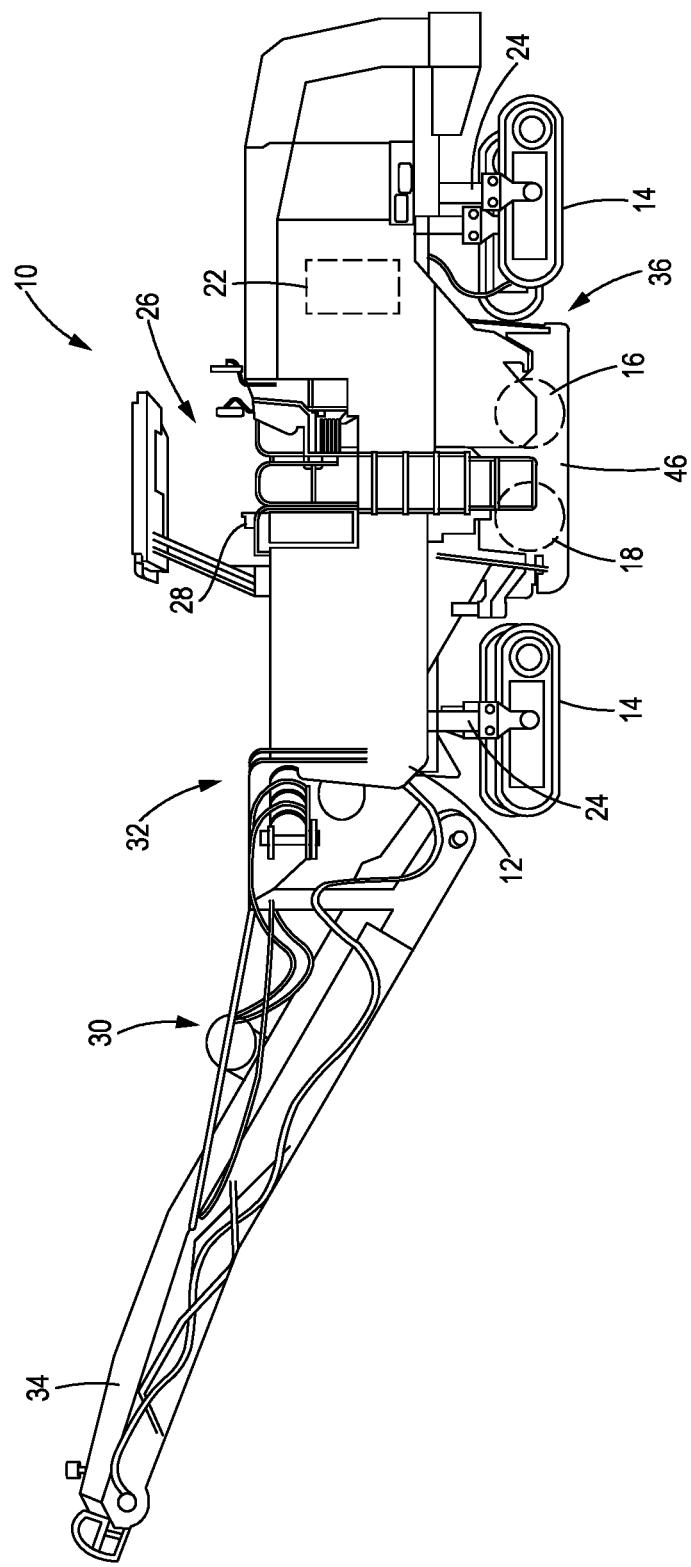
FIG. 1 is a side view of a work machine having a material evacuation system constructed in accordance with the present disclosure.

FIG. 1 illustrates a side view of a work machine 10, according to an embodiment of the present disclosure. The work machine 10, as illustrated, may be a cold planer milling machine used to remove a paving surface, such as asphalt or concrete. The work machine 10 may include a frame 12 supported by one or more ground engaging devices 14, a milling rotor 16 and a pair of augers 18, 20 rotationally supported under the frame, and an engine 22 mounted to the frame and configured to drive at least the ground engaging devices. While the work machine 10 is illustrated with track type ground engaging devices 14, the work machine 10 may alternatively be wheels or other traction device. Furthermore, while the work machine 10 is illustrated with a single rotatably-mounted milling rotor 16, two or more rotors may be connected to the work machine, although not illustrated. Such a rotatably-mounted milling rotor 16 may be utilized for a variety of tasks, and thus the term "rotor" will refer to and encompass milling heads, cutting barrels, rotors, and rotatably-mounted rollers, among others.

While not illustrated, the milling rotor 16 may be rotatably supported on the frame 12 and configured for powered rotation relative to the frame. The milling rotor 16 may have a generally cylindrical shape and include at least one cutting tool or tooth disposed peripherally along an outer surface of the milling rotor. In this way, the cutting tools or teeth perform cuts as the rotor rotates and the work machine 10 advances in a forward direction along a working surface to be milled.

The ground engaging devices 14 may be connected to actuators 24 that may be adapted to raise and lower the frame 12 relative to a ground or work surface. In this respect, raising and lowering the frame 12 may also function to vary a height and consequently a penetration depth of the milling rotor 16 into the ground surface. In an embodiment, one or more additional actuators (not shown) may be associated with the milling rotor 16 and configured to adjust the height of the milling rotor with respect to the work surface, independent of, or in conjunction with, the actuators 24. In a similar manner, each auger 18, 20 may also be connected to one or more additional actuators (not shown), such that the height of the augers may be adjusted independently of, or in conjunction with the actuators 24.

The frame 12 of the presently illustrated work machine 10 may also support an operator cab 26. In other embodiments, however, the work machine 10 may be an autonomous machine, a semiautonomous machine, a remotely operated machine, or a remotely supervised machine, among others. The operator cab 26 may include one or more control devices 28 that a user or operator may use to maneuver and control the work machine 10. The control devices 28 may include one or more joysticks, pedals, levers, buttons, steering wheels, or any other suitable control device or interface (or any of various combinations thereof) configured to be actuated or otherwise engaged to effectuate control of the work machine 10. The control devices 28 may further include a control panel for displaying visual data pertaining to the components and/or the current operation of the work machine 10 to the operator stationed within the operator cab 26.

A conveyor system 30 may be connected at a front or leading end 32 of the frame 12, and may include a conveyor belt 34 configured to transport material away from milling rotor 16 and into a waiting haul vehicle or container, for example. The milling rotor 16 and augers 18, 20 may be housed within a mill chamber 36 which may help contain material removed by the milling rotor from the ground or roadway surface.

Figure 2:
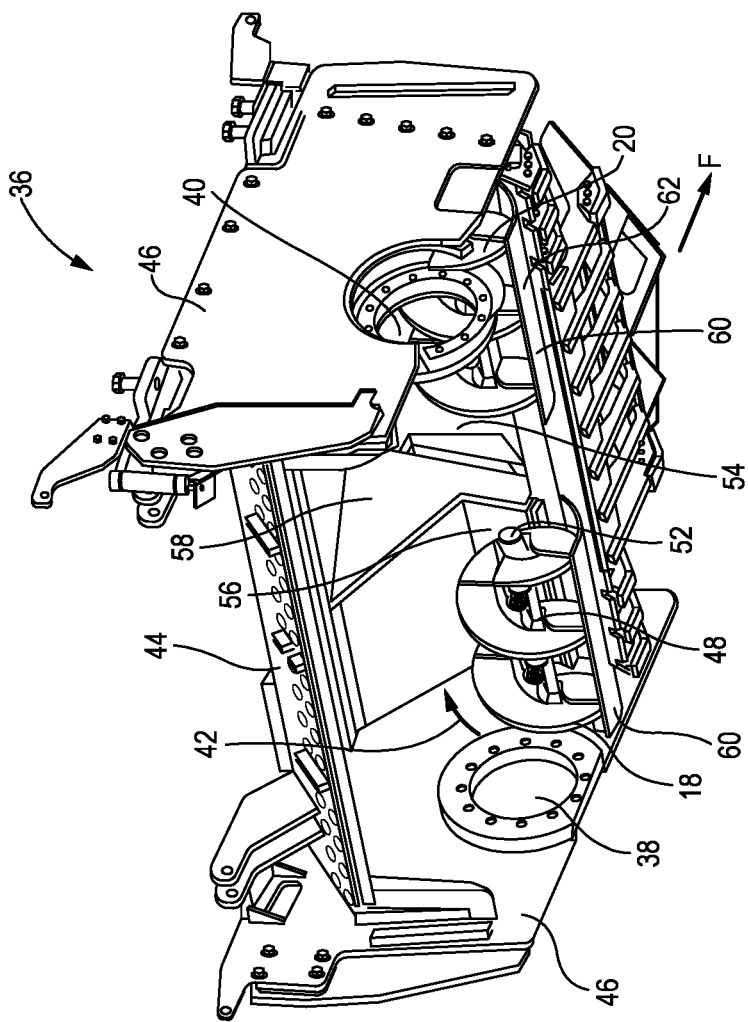
FIG. 2 is a partial side perspective view of a portion of a work machine constructed in accordance with the present disclosure.
Figure 3:
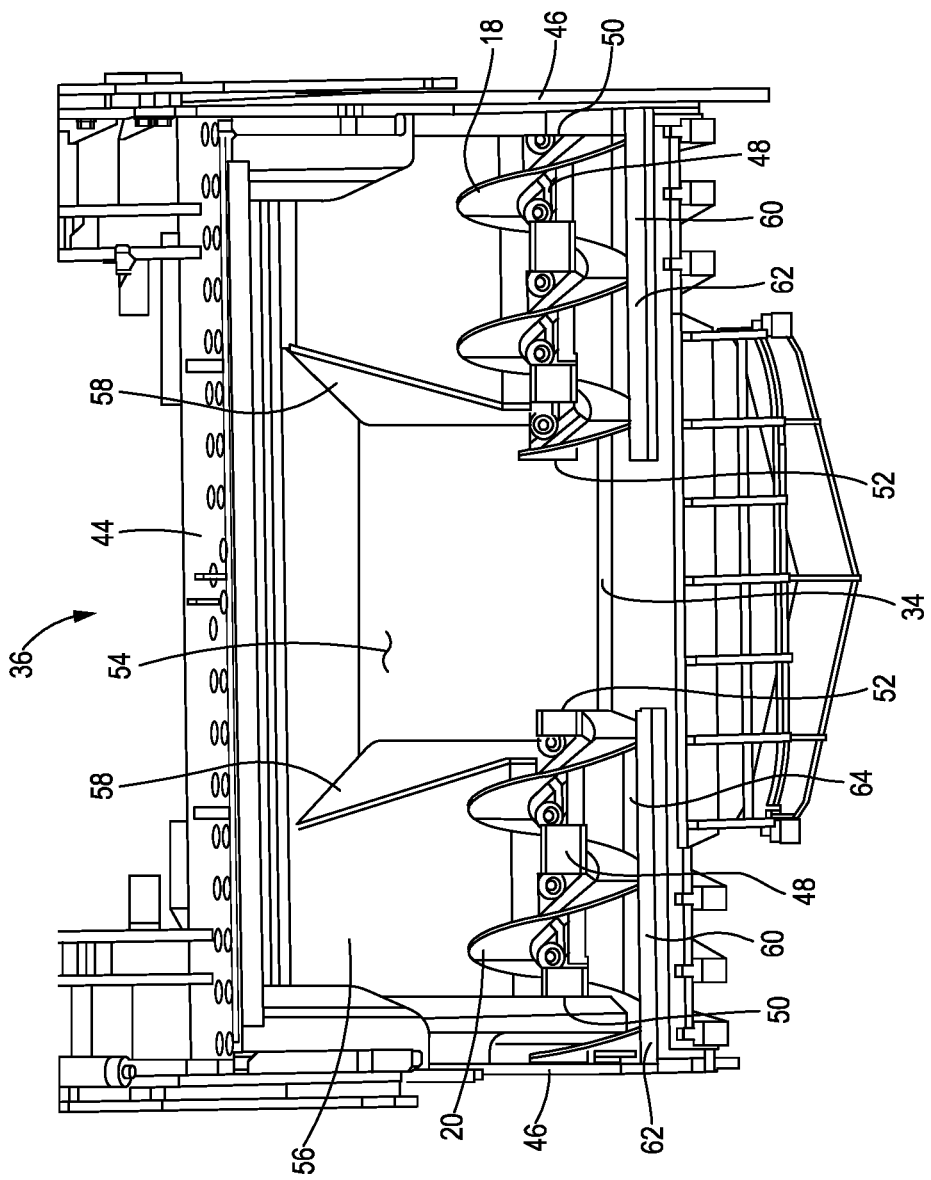
FIG. 3 is a partial rear view of a portion of a work machine constructed in accordance with the present disclosure.
Figure 4:
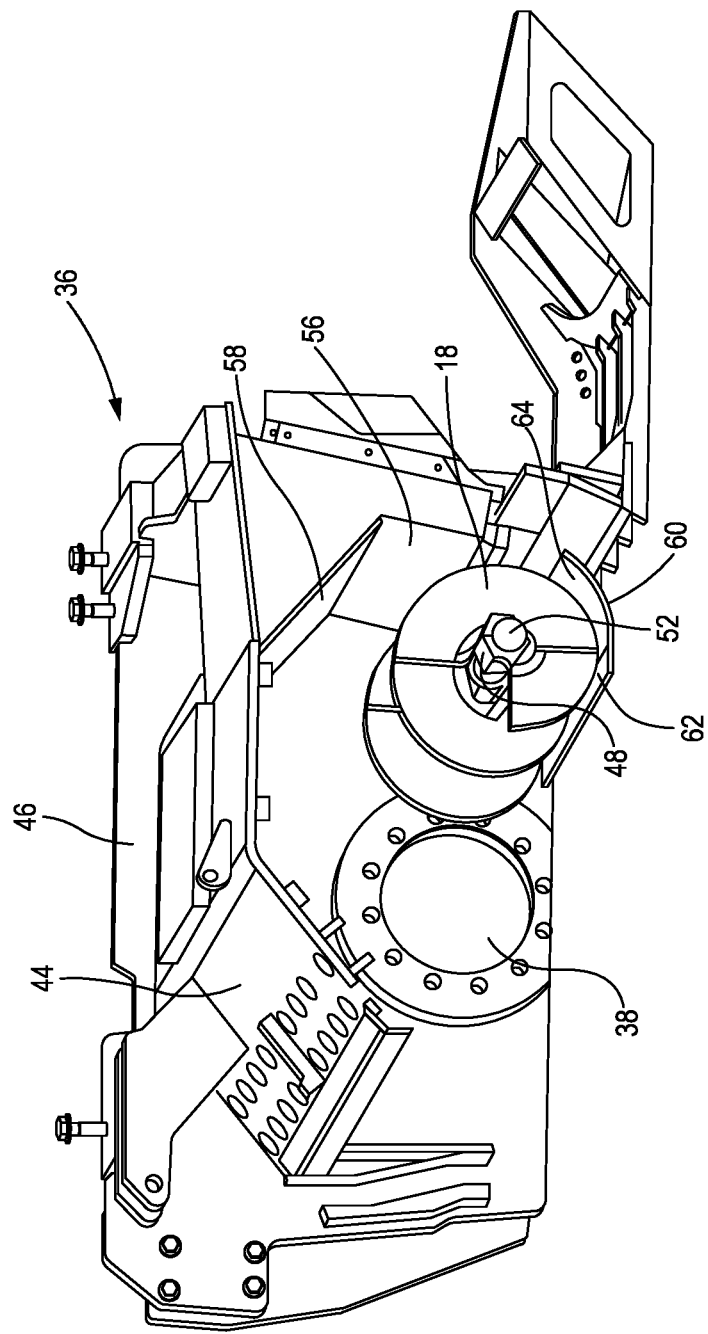
FIG. 4 is a side cutaway view of a portion of a work machine constructed in accordance with the present disclosure.

Referring now to FIGS. 2-4, a portion of the mill chamber 36 is shown in more detail. The mill chamber 36 generally includes at least a chamber wrapper plate 44 (a portion of which is illustrated in FIGS. 2-4) and a pair of side plates 46. In the depicted arrangement, the milling rotor 16 is not shown, but it should be understood that the milling rotor may be installed within, and extending between, illustrated apertures 38, 40. In the illustrated embodiment, the augers 18, 20 may be positioned in front of the milling rotor 16 in the direction of travel of the work machine 10. However, in other embodiments, the augers 18, 20 may be positioned behind the milling rotor 16, or sets of augers may be positioned both in front of, and behind, the milling rotor.

As the work machine 10 travels in a forward direction (illustrated by arrow F in FIG. 2), the augers 18, 20 may rotate in the direction of the arrow 42 in a clockwise direction. Each auger 18, 20 may be helical or corkscrew in shape, and rotate to transport material from the outer edges and corners of the mill chamber 36 toward the center of the mill chamber and to deposit the material onto the conveyor belt 34. To accomplish movement of material toward a center of the mill chamber 36 and ultimately the conveyor belt 34, each auger 18, 20 may have a directionally opposite helical twist structure. For example, if the auger 18 positioned on one side of the work machine 10 employs a counter-clockwise helical twist from a certain perspective, then the auger 20 positioned on an opposite side of the work machine 10 may employ a clockwise helical twist from the same perspective. Alternatively, the auger 18 positioned on one side of the work machine may employ a clockwise helical twist, while the auger 20 positioned on the opposite side of the work machine may employ a counter-clockwise helical twist. Each auger 18, 20 may be constructed from a metal, metal alloy, or other material able to withstand abrasion.

The milling rotor 16, while not illustrated in FIGS. 2-4, may also rotate in a counter-clockwise direction as the work machine 10 travels in a forward direction. The milling rotor 16 and the augers 18, 20 may rotate at the same speed, or differing speeds depending on settings and controls established by the operator of the work machine 10. Furthermore, the milling rotor 16 and the augers 18, 20 may be rotated and raised or lowered by a hydraulic system, or other suitable power source.

Each auger 18, 20 may include a shaft 48 rotatably coupled to an electric or hydraulic driver at a first end 50, as well as a second free end 52 opposite the first end. The augers 18, 20 may be dimensioned such that the free ends 52 of the augers 18, 20 are spaced apart to allow for material to be driven into the center of the mill chamber 36 and onto the conveyor belt 34 through an opening 54 in a front wall 56 of the mill chamber. A pair of flaps 58 extending rearwardly from the front wall 56, toward the augers 18, 20, may be positioned on each side of the opening 54 to further facilitate direction of material toward the conveyor belt 34.

Figure 5:
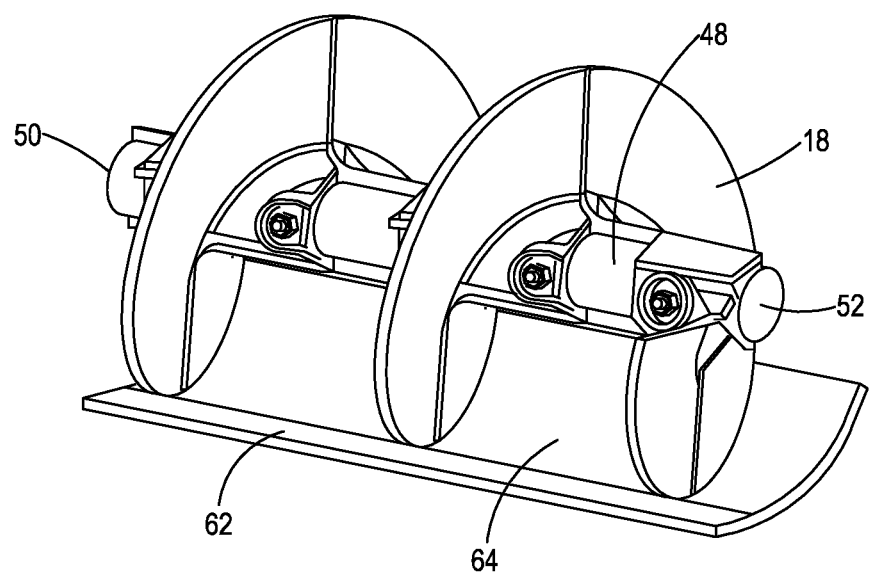
FIG. 5 is a side elevated perspective view of an auger of a work machine constructed in accordance with the present disclosure.

With reference to FIG. 5, and continued reference to FIGS. 2-4, a pair of guard plates 60, one associated with each auger 18, 20, may be fixed to each side plate 46 and extend away from the side plate toward a center of the mill chamber 36. Each guard plate 60 may be formed from a relatively flat portion 62 and a curved portion 64 that may be welded or otherwise fixed together. The guard plate 60 may be made of steel or other wear resistant metal. The curved portion 64 and the flat portion 62 may be be individually replaceable in the event of wear or damage.

INDUSTRIAL APPLICABILITY

In practice, the teachings of the present disclosure may find applicability in many industries including, but not limited to, construction and paving equipment. As one particular example, the present disclosure may be beneficial to cold planer machines. The present disclosure provides a cold planer milling machine with at least one auger that directs tailings and other debris away from the side plates of the mill chamber of the milling machine and onto a conveyor belt, thereby removing unwanted paving material and preventing uneven, incomplete or partial distribution of new paving material.

Figure 6:
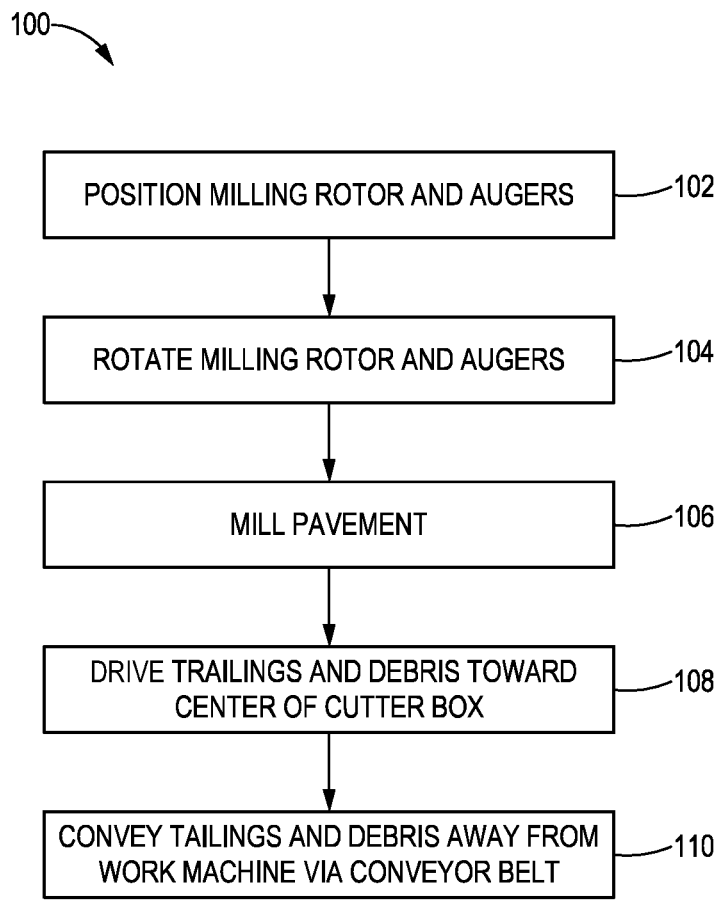
FIG. 6 is a flowchart of an embodiment of a series of steps for removing a surface of pavement using a work machine constructed in accordance with a method of the present disclosure.

A series of steps 100 involved in milling the ground surface is illustrated in a flowchart format in FIG. 6. As shown therein, in a first step 100, the milling rotor 16 and the augers 18, 20 may be lowered into a position for milling a surface of pavement. While this step may be accomplished by an operator of the work machine 10, it is also contemplated that this step may be accomplished autonomously or semi-autonomously. Further, while the pavement surface may be asphalt, other paving materials such as concrete, gravel, or brick are also considered.

Once the augers 18, 20 and milling rotor 16 is in position, an operator of the work machine 10 may provide power, such that the milling rotor and augers begin rotating (step 104). More specifically, the operator of the work machine 10 may set a rotational direction of the milling rotor 16 and the augers 18, 20. This may be accomplished manually, or by using the input devices 28 in the operator cab 26. During operation, the milling rotor 16 and the augers 18, 20 may rotate in the same direction. In one embodiment, the milling rotor 16 and the augers 18, 20 may rotate in an up-cut rotational direction, or counter-clockwise when viewing the work machine from the side illustrated in FIGS. 2 and 4, or clockwise when viewing the work machine from the side illustrated in FIG. 1.

While the augers 18, 20 and milling rotor 16 are rotating, the work machine 10 may move in a forward direction to begin milling the pavement surface (step 106). During operation, the teeth of the milling rotor 16 may be angled such that the teeth dig in a downward direction into the pavement, rotate toward the front end 32 of the work machine 10, and tear or carry up the broken pavement pieces, generally directing them toward the conveyor belt 34 to be carried away from the work machine.

In a step 108, a portion of the paving material, tailings or debris, may be thrown or tossed within the mill chamber 36. As this paving material lands on the guard plates 60, the rotating augers 18, 20 drive the material back toward the center of the mill chamber 36, and ultimately onto the conveyor belt 34. This material is then carried away on the conveyor belt 34 toward a waiting vehicle or other location.

While a series of steps and operations have been described herein, those skilled in the art will recognize that these steps and operations may be re-arranged, replaced, or eliminated, without departing from the spirit and scope of the present disclosure as set forth in the claims.

Furthermore, while aspects of the present disclosure have been particularly shown and described with reference to the embodiments above, it will be understood by those skilled in the art that various additional embodiments may be contemplated by the modification of the disclosed machines, systems and assemblies without departing from the scope of what is disclosed. Such embodiments should be understood to fall within the scope of the present disclosure as determined based upon the claims and any equivalents thereof.

What is claimed is:

1. A work machine, the work machine comprising:
   a frame;
   a plurality of ground engaging mechanisms;
   a conveyor assembly including a conveyor belt;
   a mill chamber, the mill chamber including a rotor having a plurality of teeth and a front plate, the front plate defining an opening;
   a first auger mounted on a first shaft, the first shaft having a first free end; and
   a second auger mounted on a second shaft, the second shaft having a second free end, the first and second free ends being spaced apart and laterally flanking the opening.

2. The work machine of claim 1, wherein the first and second augers are rotatably fixed within the mill chamber, and the first and second augers both rotate about a single axis.

3. The work machine of claim 1, further including the conveyor belt positioned proximate the mill chamber at a front end of the work machine.

4. The work machine of claim 3, wherein the first and second augers are positioned linearly between the rotor and the conveyor belt.

5. The work machine of claim 1, wherein the mill chamber further includes a curved guard plate extending a length of the auger.

6. The work machine of claim 5, wherein the guard plate is fixed to one of a plurality of side plates or the front plate, and is positioned between the first and second augers and a ground surface.

7. The work machine of claim 1, wherein the first and second augers are rotatably fixed within the mill chamber, and the height of each auger may be independently adjusted by an actuator independently connected to each auger.

8. A mill chamber assembly for a work machine, the mill chamber including:
   a plurality of side plates;
   a front plate, the front plate defining an opening;
   a milling rotor having a plurality of teeth;
   a first auger rotatably coupled to one of the plurality of side plates, the first auger having a helical twist in a first rotational direction, the first auger further including a first shaft having a first free end; and
   a second auger rotatably coupled to one of the plurality of side plates, the second auger having a helical twist in a second direction, the second auger further including a second shaft having a second free end;
   the first auger and the second auger being positioned forward of the milling rotor in a direction of travel of the work machine, the first free end and the second free end being spaced apart and laterally flanking the opening.

9. The mill chamber assembly of claim 8, wherein the first shaft extends axially through a center of the first auger, and the second shaft extends axially through a center of the second auger.

10. The mill chamber assembly of claim 9, wherein the first shaft and the second shaft are aligned along a rotational axis.

11. The mill chamber assembly of claim 10, wherein the first auger and the second auger rotate in the same rotational direction about the rotational axis.

12. The mill chamber assembly of claim 8, further including a first guard plate fixed to one of the plurality of side plates and extending a length of the first auger, and a second guard plate fixed to one of the plurality of side plates and extending a length of the second auger.

13. The mill chamber assembly of claim 12, wherein the first guard plate is positioned between the first auger and a pavement surface, and the second guard plate is positioned between the second auger and the pavement surface.

14. The mill chamber assembly of claim 8, further including a mold board positioned behind the milling rotor.

15. The mill chamber assembly of claim 8, wherein the opening is proximate the conveyor belt.

16. The mill chamber assembly of claim 8, wherein the first and second augers are rotatably fixed within the mill chamber, and the height of each auger may be independently adjusted by an actuator independently connected to each auger.

17. A method of operating a work machine, the work machine having a milling rotor and a first and second augers, the first and second augers being positioned ahead of the milling rotor in a direction of travel of the work machine, the method comprising:
   positioning the milling rotor and the augers proximate a pavement surface;

spacing the first and second augers apart to laterally flank an opening to a conveyor belt;
rotating the milling rotor and the first and second augers;
milling a portion of the pavement surface;
generating tailings;
driving, by the first and second augers, the tailings toward the conveyor belt; and
conveying, by the conveyor belt, the tailings away from the work machine.

18. The method of claim 17, further including driving, by the first and second augers, the tailings toward a center of a mill chamber and onto the conveyor belt aligned in the center of the mill chamber.

19. The method of claim 18, wherein during the rotating, the milling rotor and each of the first and second augers rotate in the same direction and about the same axis.

* * * * *